United States Patent [19]
Toyoda

[11] Patent Number: 4,814,127
[45] Date of Patent: Mar. 21, 1989

[54] METHOD OF PRODUCING A REINFORCED CERAMIC

[75] Inventor: Tatsuo Toyoda, Nagoya, Japan

[73] Assignee: Aisin Seiki Kabushiki Kaisha, Kariya, Japan

[21] Appl. No.: 32,250

[22] Filed: Mar. 31, 1987

[30] Foreign Application Priority Data

Mar. 31, 1986 [JP] Japan ................................. 61-73435

[51] Int. Cl.$^4$ ............................................. C04B 33/28
[52] U.S. Cl. ....................................... 264/56; 264/86; 264/87
[58] Field of Search .............................. 264/86, 87, 56

[56] References Cited

U.S. PATENT DOCUMENTS 3,500,444 3/1970 Hesse et al. ............................ 264/87
4,401,613 8/1983 Abell ...................................... 264/86

FOREIGN PATENT DOCUMENTS 59-54679 3/1984 Japan .

Primary Examiner—James H. Derrington
Attorney, Agent, or Firm—Oblon, Fisher, Spivak, McClelland & Maier

[57] ABSTRACT

A method of producing a reinforced ceramic which includes a step of aggregating ceramic fibrous material of 0.5 μm or more in diameter; a composite step in which the fiber aggregate obtained is placed on a filter and a dispersion liquid in which ceramic powder having a particle size of not more than one-tenth of the diameter of the ceramic fibrous material is dispersed in a dispersion medium is transferred through the fiber aggregate from a side opposite to the filter to the other side, for passing the dispersion medium through said filter and introducing the ceramic powder in a gap between the fibrous material of the fiber aggregate to form a composite of the fibrous material and the ceramic powder; and a step of sintering the composite.

7 Claims, 1 Drawing Sheet

METHOD OF PRODUCING A REINFORCED CERAMIC

BACKGROUND OF THE INVENTION

1. Field of the Invention

The present invention relates to a method of producing a reinforced ceramic as a strength-required structural member.

2. Description of the Prior Art

There has been known a ceramic fiber reinforced ceramic in which ceramic fibers are integrally buried in a ceramic sintered body. As a method of producing this type of the reinforced ceramic, it has been reported to produce a fiber reinforced ceramic pipe by weaving ceramic fibers in a tubular form, and depositing ceramic fine powder on a surface of the tubular ceramic, and burying a gap between the fibers by a chemical vapor deposition (CVD) method. The above-mentioned CVD method is very poor in productivity and difficult in mass production. Also, Japanese Patent Laid-Open No. 54679/1984 discloses a method of producing a reinforced ceramic by growing a whisker in ceramic powder and sintering the composite of the whisker thus obtained and the ceramic powder by a hot press or a hot isostatic press, thereby producing a reinforced ceramic in which a whisker is dispersed and buried in a sintered body. Also, the method of forming a whisker in the ceramic powder restricts a combination of ceramic powder and a ceramic fiber and has difficulty in manufacturing long whiskers of more than 10 μm in length.

SUMMARY OF THE INVENTION

It is an object of the present invention to provide a method of producing a fiber or whisker reinforced ceramic in a simple process.

It is another object of the present invention to provide a method of producing a fiber or whisker reinforced ceramic having improved toughness.

A method of producing reinforced ceramic according to the present invention comprises:

an aggregating step wherein ceramic fibrous material of 0.5 μm or more in diameter aggregates to produce a fiber aggregate;

a composite step wherein said fiber aggregate is placed on a filter, and a dispersion liquid in which ceramic powder having a particle size of not more than one-tenth of the diameter of said ceramic fibrous material is dispersed in a dispersion medium is transferred through said fiber aggregate from a side opposite to said filter to the other side, passing said dispersion medium through said filter and introducing said ceramic powder in a gap between said fibrous material of said fiber aggregate to form a composite of said fibrous material and said ceramic powder; and a sintering step wherein said composite is heated to a sintering temperature of said ceramic powder and wherein, in said composite step, a second filter with large pores is placed on the fiber aggregate, means for compressing fiber aggregate is placed on a second filter and in the dispersion liquid, and the dispersion medium is transferred through the pores of the second filter.

In the method of the present invention, the particle size of ceramic powder is restricted so as to be as small as not more than one-tenth of a diameter of a ceramic fibrous material, so as to allow easy introduction of the ceramic powder in a gap between the ceramic fibrous material of the fiber aggregate.

As constituents of a reinforced ceramic produced by the present invention, any ceramic fibrous material such as ceramic fiber and whisker can be employed as long as the ceramic fibrous material is stable at the sintering temperature of a ceramic powder. The fibrous material and the powder may be of the same ceramic. Alumina ($Al_2O_3$), silicon carbide (SiC), silicon nitride ($Si_3N_4$), and silica ($SiO_2$) may be employed as ceramic powder. The ceramic powder preferably includes 2-20 wt % of a sintering agent, such as a binary or ternary compound of magnesium oxide (MgO), yttrium oxice ($Y_2O_3$), boron oxide ($B_4C$), alumina ($Al_2O_3$) or the like. As a ceramic fibrous material employed in the present invention, fibers such as of alumina ($Al_2O_3$), carbon (C), alumina-silica ($Al_2O_3$-$SiO_2$), silicon carbide (SiC), silicon nitride ($Si_3N_4$), and zirconium oxide ($ZrO_2$), and ceramic whiskers such as of silicon carbide (SiC) and silicone nitride ($Si_3N_4$) can be employed. It is desirable to use a mono crystal fiber as the ceramic fibrous material.

The first step of the method of the present invention is an aggregating step to aggregate ceramic fibrous material of 0.5 μm or more in diameter. In this step, a ceramic fibrous material is dispersed in water or other suitable liquid, and then the liquid is filtered to collect the ceramic fibrous material on a filter sheet. Thus obtained in a sheet-type fiber aggregate in which the ceramic fibrous material is two-dimensionally oriented. The thickness of the sheet-type fiber aggregate can be arbitrarily selected in accordance with the shape of a desired reinforced ceramic as a final product. The sheet-type fiber aggregate may be cut into a desired shape.

The fiber aggregate may also be produced by introducing a ceramic fibrous material in a compression mold to an approximately uniform thickness and pressing the fibrous material to form a plate-type fiber aggregate.

The fiber aggregate can also be constituted by a multi-layered ceramic paper or ceramic frakes.

The second step of the method of the present invention is a step of forming a composite of a ceramic fibrous material and ceramic powder. In this step, the fiber aggregate obtained in the aggregating step is placed on one side of a filter and a dispersion liquid in which ceramic powder is dispersed in a dispersion medium by means of a supersonic mill is transferred from one side of the fiber aggregate to the other side, allowing the dispersion medium to be passed through the fiber aggregate and the ceramic powder to be retained in the gap between the fibers of the fiber aggregate.

The particle size of the ceramic powder used in the present method is not more than one-tenth of the diameter of the ceramic fibrous material. As the value, the ceramic powder may have a particle size of 1 μm or less, preferably about 0.01 μm.

As a dispersion medium, alcohol, ketones, amines, carboxylic acids and other suiable liquids are employable. Supersonic vibrations are preferably applied to the dispersion medium to ensure that each of the fibrous material is uniformly and individually dispersed therein.

As a filter, a micropore film filter which does not pass ceramic powder of 0.01 μm is employed. To support the film filter under the high pressure, a ceramic filter is preferably disposed at the back of the film filter. Also, the compression should be made under a vacuum of $10^{-3}$ Torr or less, desirably about $10^{-5}$ Torr.

It is preferable to keep respective fibers of the fiber aggregate in a fixed position to prevent them from dispersing again and widening their distances. For this purpose, a process of embracing the fiber aggregate by two type of filters and compressing the fiber aggregate vertically is preferably added in the second step. One of said filters embracing the fiber aggregate is a micropore film which has pores minute enough to prohibit the ceramic powders from passing therethrough. The other of said filters has large pores which allow the ceramic powders to be passed therethrough. In the second step, the ceramic powders are supplied to the fiber aggregate through the filter with large pores.

DESCRIPTION OF THE PREFERRED EMBODIMENTS

Figure 1:
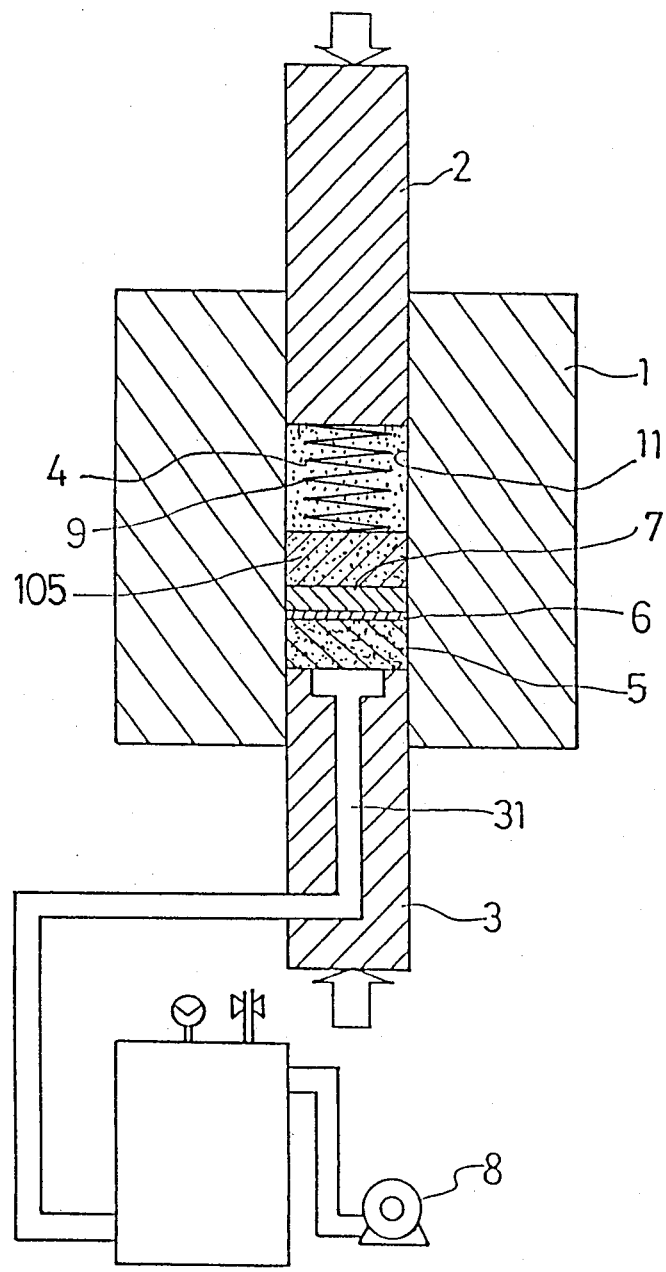
FIG. 1 shows an example of a device used in the composite step.

Numeral 1 designates a die having a center through hole 11. An upper punch 2 and a lower punch 3 are respectively inserted in the center hole 11 from the opposite side and pressed by a compression apparatus.

The lower punch 3 has a communication hole 31 formed in the axial direction. On the lower punch 3, a first ceramic filter 5, a micropore film filter 6 and a fiber aggregate 7, a second ceramic filter 105 and a coil spring 9 as compressing means are respectively provided in such order from the bottom. The pore size of the filter 6 is very small. However, the pore size of the ceramic filters 5 105 are relatively large, so that the ceramic powders can be easily passed therethrough. The two ceramic filters compress the fiber aggregate by compressing pressure applied by the coil spring 9. Because of the pore size of the filter 6 is very small and the fiber aggregate is very closely woven, the filtration rate of the dispersion medium is very slow and the dispersion liquid 4 hardly drops into a communication hole 31 of the lower punch 3 in a normal state. Therefore, it is preferable that a pressure of 0.05 to 1 t/cm$^2$ be applied by the upper and lower punches 2 and 3 so as to impregnate the dispersion liquid 4 into a gap between the fibers of the fiber aggregate 7, and allow only the dispersion medium to be passed through the film filter 6 and the ceramic filter 5 and discharged from the communication hole 31 of the lower punch 3. It is also preferable that a vacuum pump 8 be provided to communicate with the communication hole 31 of the lower puch 3, so as to let the dispersion medium be sucked up and evaporated and dry the fiber aggregate 7.

The dispersion medium can also be discharged from the upper punch side by forming a similar communication hole to that of the lower punch in the upper punch and providing a fiber aggregate, a ceramic filter and a film filter thereon.

The composite of the fiber aggregate and the ceramic powder formed in the composite step is then dried. It is preferable that the composite be placed in a nitrogen atmosphere and heated at a temperature raised at a rate of 0.5° C./min up to 200° C. The time of holding the composite at 200° C. depends on the size of the composite.

Then the dried composite is compressed under a hydrostatic pressure of 0.5 t/cm$^2$–6 t/cm$^2$.

The sintering step of the present invention is to heat the composite under the sintering conditions of the ceramic powder and form a sintered body in which the ceramic fibers are integrally buried in the ceramic powder. The sintering step is basically the same as the step of sintering ceramic powder in the conventional method. In the case of using a hot press, a pressure of 100–700 kg/cm$^2$ is applied to the composite in a nitrogen atmosphere and heated for sintering the same.

The sintering temperature depends on the material of the ceramic powder. When the matrix is alumina (Al$_2$O$_3$), the composite should be sintered at a temperature of between 1400° and 1600° C. for four hours. When the matrix is silicon carbide (SiC), the composite should be sintered at a temperature of between 2,000° and 2,300° C. for four hours. When the matrix is silicon nitride (Si$_3$N$_4$), the composite should be sintered at a temperature of between 1,600° and 1,800° C. for four hours.

In the method of producing a reinforced ceramic according to the present invention, the diameter of the ceramic fiber is larger than the particle size of the ceramic powder by a factor of 10 or more. Thus, ceramic powder is easily introduced into a gap between the fibers of the ceramic fiber aggregate. Therefore, a ceramic fiber and ceramic powder are uniformly dispersed in the composite. Accordingly, the resulting reinforced ceramic powder exhibits predetermined uniform characteristics.

Also, in the method of the present invention, a composite of a ceramic fibrous material and ceramic powder is obtained as long as the ratio of the diameter of the ceramic fibrous material to the particle size of the ceramic powder is in a certain range. Therefore, many combinations of ceramic fibrous material and ceramic powder are possible.

(EXAMPLE 1)

A silicon carbide whisker having a diameter of 0.5 μm and a length of 50 μm were employed as a reinforcing fiber. Fine blocks of whisker was classified in size by a screen and dispersed in ethyl alcohol. Then the whisker was collected from the alcohol and press-formed into a fiber aggregate. This fiber aggregate has a diameter of 15 mm and a thickness of 3 mm.

Meanwhile, silicon carbide of 0.1 μm in particle size, 1.5 weight % of boron carbide (B$_4$C) of 0.1 μm in particle size and 1.5 weight % of carbon of 0.1 μm in particle size were respectively dispersed in a mixture of oleic acid an octyl alcohol by means of a supersonic mill. After placing the fiber aggregate in a press mold shown in FIG. 1, the dispersion liquid was introduced into the cavity, and compressed under a pressure of 500 kg/cm$^2$ and sucked by a vacuum of 10$^{-4}$ Torr. In addition, the ceramic powders were introduced into the gaps between the fibers by passing through the pores of the ceramic filters to produce a composite.

Then the composite was heated for drying up to 200° C. under a nitrogen atmosphere, and press-shaped by a static pressure of 2 t/cm$^2$. The, the SiC-based composite was then sintered at 2,050° C. for four hours under a pressure of 400 kg/cm$^2$ by hot press. By employing this method, a reinforced ceramic of this invention was obtained.

(EXAMPLE 2)

In a method of producing a reinforced ceramic of example 2, a silicon carbide whisker having a diameter of 0.5 μm and a length of 50 μm was employed as a reinforcing fiber, and a fiber aggregate was obtained by the same manner as in example 1.

Employing the mehod of example 1, silicon nitride of 0.3 μm in particle size and a sintering agent was dispersed in a mixture of oleic acid and octyl alcohol, and a Si₃N₄-based composite was obtained by pressing and sucking the fiber aggregate which was passed through by the dispersion medium containing ceramic powders. The employed sintering agent was composed of 5 wt % of alumina of 0.2 μm in particle size and 5 wt % of yttoria of 0.2 μm in particle size.

Then the composite was sintered at 1700° C. for four hours under a pressure of 400 kg/cm². By so doing, a reinforced ceramic of the present invention was obtained.

(COMPARATIVE EXAMPLE)

As a comparative specimen, the same whisker as used in the present invention was directly mixed with silicon carbide powder and the sintering agent without forming a fiber aggregate preform. Also, Si₃N₄-based composite formed without a fiber aggregate preform was prepared for comparison.

The critical stress intensity factor Kic of each of the examples of the present invention and the comparative specimens was examined by an indentation fracture method. the table below shows the results of such comparison.

TABLE

| matrix | CRITICAL STRESS INTENSITY FACTOR Kic (MPam$^{\frac{1}{2}}$) | |
| --- | --- | --- |
| | SiC | Si₃N₄ |
| without whisker preform | 3.5 | 7.0 |
| whisker preform (30%) | 8.4 | 13.5 |

It is apparent from the Table that the critical stress instensity factors Kic of the reinforced ceramics of the present invention were improved by 2 to 2.5 times those of the reinforced ceramics of the prior art.

Obviously, numerous modifications and variations of the present invention are possible in light of the above teachings. It is therefore to be understood that within the scope of the appended claims, the invention may be practiced otherwise than as specifically described herein.

What is claimed and secured by Letters Patent of the United States is:

1. A method of producing a reinforced ceramic comprising:

an aggregating step wherein ceramic fibrous material of 0.5 μm or more in diameter aggregate to produce fiber aggregate;

a composite step wherein said fiber aggregate is placed on a first filter, and a dispersion liquid in which ceramic powder having one-tenth or less of the diameter of said ceramic fibrous material is dispersed in a dispersion medium and is transferred through said fiber aggregate from a side opposite said first filter to the other side, for passing said dispersion medium through said first filter and introducing said ceramic powder in a gap formed between said fibrous material of said fiber aggregate to form a composite of said fibrous material and said ceramic; and a sintering step wherein said composite prepared is heated to a sintering temperature of said ceramic powder and wherein, in said composite step, a second filter with large pores is placed on said fiber aggregate, means for compressing fiber aggregate is placed on said second filter and in said dispersion liquid, and said dispersion medium is transferred through the pores of said second filter.

2. A method of producing a reinforced ceramic according to claim 1, wherein in the aggregating step said ceramic fibrous material is selected from the group consisting of (Al₂O₃) fiber, carbon (C) fiber, alumina-silica (Al₂O₃-SiO₂) fiber, silicon carbide (SiC) fiber, silicon nitride (Si₃N₄) fiber,, zirconium oxide (ZrO₂) fiber, silicon carbide (SiC) whisker, silicon nitride (S3I.N₄) whisker and a mixture thereof.

3. A method of producing a reinforced ceramic according to claim 1, wherein said ceramic powder is selected from the group consisting of alumina (Al₂O₃), silicon carbide (SiC), silicon nitride (Si₃N₄), silica (SiO₂) and a mixture thereof, and has a particle diameter of 1 μm or less.

4. A method of producing a reinforced ceramic according to claim 1, wherein said ceramic powder contains a sintering agent in a range of from 2 to 20 wt % thereof.

5. A method of producing a reinforced ceramic according to claim 1, wherein said ceramic powder includes a sintering agent which is one selected from the group consisting of magnesium oxide (MgO), yttrium oxide (Y₂O₃), boron oxide (B₄C), alumina (Al₂O₃) and a mixture thereof.

6. A method of producing a reinforced ceramic according to claim 1, wherein said dispersion liquid is selected from the group consisting of alcohol, ketones, amines and carboxylic acids and a mixture thereof.

7. A method of producing a reinforced ceramic according to claim 1, wherein a vacuum of not more than 10⁻³ Torr is applied to said other side of said filter in said composite step.

* * * * *